US009983063B1

(12) United States Patent
Tener et al.

(10) Patent No.: US 9,983,063 B1
(45) Date of Patent: May 29, 2018

(54) MULTISPECTRAL IMAGING VIA CODED APERTURE

(71) Applicant: Lockheed Martin Corporation, Bethesda, MD (US)

(72) Inventors: Gene D. Tener, Oviedo, FL (US); Abhijit Mahalanobis, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 235 days.

(21) Appl. No.: 14/687,364

(22) Filed: Apr. 15, 2015

Related U.S. Application Data

(60) Provisional application No. 61/979,901, filed on Apr. 15, 2014.

(51) Int. Cl.
G01B 11/14 (2006.01)
G01J 3/51 (2006.01)
G01J 3/02 (2006.01)
G01J 3/46 (2006.01)

(52) U.S. Cl.
CPC .............. G01J 3/513 (2013.01); G01J 3/0286 (2013.01); *G01J 2003/466* (2013.01)

(58) Field of Classification Search
CPC ........................... G01J 3/513; G01J 2003/466
USPC ........................................................ 356/614
See application file for complete search history.

(56) References Cited

U.S. PATENT DOCUMENTS 4,125,317 A * 11/1978 Gordon ................. G01B 5/205
356/390
5,724,259 A * 3/1998 Seymour ............. B41F 33/0036
101/211
7,888,624 B1 * 2/2011 Murguia ................... G01J 3/51
250/208.1

(Continued)

OTHER PUBLICATIONS

Final Office Action for U.S. Appl. No. 13/951,690, dated Feb. 16, 2016, 10 pages.

(Continued)

*Primary Examiner* — Hina F Ayub
(74) *Attorney, Agent, or Firm* — Withrow & Terranova, PLLC

(57) ABSTRACT

Mechanisms for identifying energy received from a scene are provided. A coded aperture in an optical system receives energy from a scene. The coded aperture comprises a plurality of wavelength filter sets arranged in a predetermined pattern. Each wavelength filter set is configured to transmit energy in a corresponding wavelength band of a plurality of different wavelength bands. The coded aperture transmits the energy toward a detector array comprising a plurality of detector elements. The detector array generates sensor data that quantifies energy received by each detector element. The sensor data is processed based on the predetermined pattern to identify spatial locations of energy in each corresponding wavelength band with respect to the scene.

21 Claims, 13 Drawing Sheets

(56) References Cited

U.S. PATENT DOCUMENTS

| | | | |
|---|---|---|---|
| 2002/0122595 A1* | 9/2002 | Crill | G02B 27/46 382/211 |
| 2008/0218851 A1* | 9/2008 | Chen | G02B 23/12 359/419 |
| 2010/0208951 A1* | 8/2010 | Williams | G06K 9/2018 382/117 |
| 2010/0253941 A1* | 10/2010 | Brady | G01J 3/02 356/310 |
| 2011/0267486 A1* | 11/2011 | Kane | H04N 5/2226 348/222.1 |
| 2012/0105646 A1* | 5/2012 | Oster | G01J 5/06 348/164 |
| 2012/0281197 A1* | 11/2012 | Tharaldsen | G01N 21/95623 355/71 |
| 2013/0190563 A1* | 7/2013 | Pascal | G02B 5/201 600/109 |
| 2013/0208082 A1 | 8/2013 | Williams et al. | |
| 2014/0027616 A1 | 1/2014 | Twede et al. | |
| 2014/0371571 A1* | 12/2014 | Tsujita | A61B 8/5215 600/407 |

OTHER PUBLICATIONS

Notice of Allowance and AFCP 2.0 Decision for U.S. Appl. No. 13/951,690, dated Apr. 26, 2016, 9 pages.

Author Unknown, "An Introduction to Hyperspectral Imaging Technology," Space Computer Corporation, 2006, Los Angeles, California, 36 pages.

Non-Final Office Action for U.S. Appl. No. 13/951,690, dated Jul. 16, 2015, 9 pages.

Author Unknown, "Knowledge Enhanced Exapixel Photography (KEEP): Compressive Video," Duke Imaging and Spectroscopy Program (DISP), Coded Aperture Compressive Temporal Imaging (CACTI) system Project, SnapLook Parsed Document, May 10, 2013, http://www.disp.duke.edu/projects/CACTI/?print, Llamas, inc., 12 pages.

Wagadarikar, Ashwin A. et al., "Video rate spectral imaging using acoded aperture snapshot spectral imager," Optics Express, vol. 17, Issue 8, Apr. 13, 2009, Optical Society of America, pp. 6368-6388.

* cited by examiner

MULTISPECTRAL IMAGING VIA CODED APERTURE

RELATED APPLICATIONS

This application claims the benefit of provisional patent application Ser. No. 61/979,901, filed Apr. 15, 2014, the disclosure of which is hereby incorporated herein by reference in its entirety.

TECHNICAL FIELD

The embodiments relate to identifying energy of different wavelengths received from a scene.

BACKGROUND

Image detectors, such as focal plane arrays, CMOS detectors, CCD detectors, and the like, typically utilize relatively broadband detector elements that are not able to distinguish the particular wavelength of energy received by the detector element. In some applications, color filters, such as a Bayer filter, may be utilized at the image plane to selectively allow light of various frequencies to pass onto particular detector elements, and the sensor data generated by the detector elements may be processed, such as by interpolation, to infer which wavelengths were received by which detector elements. However, in many applications, filters at the image plane suffer shortcomings, such as the introduction of crosstalk.

Many applications require the ability to identify certain wavelengths of energy in a scene. For example, the presence of energy in certain wavelengths may be indicative of an event, such as a missile launch or a nuclear material leak. In the context of energy in the infrared (IR) wavelength band, two individual mid-wave IR focal plane arrays (FPA) may be useful, for example, to facilitate clutter rejection in certain applications. Unfortunately, the cost and complexity of stacked FPAs is prohibitive for many applications. Moreover, the use of a color filter array may cause excessive spectral crosstalk.

SUMMARY

The embodiments implement multispectral imaging using a coded aperture. Among other advantages, the embodiments implement mechanisms for identifying energy of particular wavelengths received from a scene, and the spatial locations within the scene of such energy, without the use of multiple sensors, such as multiple focal plane arrays, or the use of a color filter array.

In one embodiment, a method for identifying energy received from a scene is provided. A coded aperture in an optical system receives energy from the scene. The coded aperture comprises a plurality of wavelength filter sets arranged in a predetermined pattern. Each wavelength filter set is configured to transmit energy in a corresponding wavelength band of a plurality of different wavelength bands. The coded aperture transmits the energy toward a detector array comprising a plurality of detector elements. The detector array generates sensor data that quantifies energy received by each detector element. The sensor data is processed based on the predetermined pattern to identify spatial locations of energy in each corresponding wavelength band with respect to the scene.

In one embodiment, for each wavelength band of the plurality of different wavelength bands, a corresponding intensity spatial frequency range of a plurality of different intensity spatial frequency ranges based on the predetermined pattern is determined. The sensor data is processed to identify corresponding subsets of the energy within the different intensity spatial frequency ranges. For each wavelength band, a corresponding wavelength band image of a plurality of wavelength band images is generated based on the corresponding subset of energy for each wavelength band that identifies spatial locations of the subset of energy with respect to the scene.

In one embodiment, energy that is outside the intensity spatial frequency ranges is filtered out after processing the sensor data to identify the corresponding subsets of energy within the intensity spatial frequency ranges.

In one embodiment, for each respective wavelength band, the corresponding subset of energy is processed with an inverse Fourier transform to generate a corresponding wavelength band image that identifies the spatial locations of the subset of energy with respect to the scene.

In one embodiment, at least one presentation image is generated based on one or more of the plurality of wavelength band images, the at least one presentation image comprising colorized data configured to be visible to a human eye that identifies the spatial locations of the corresponding subsets of energy of the one or more of the plurality of wavelength band images. The at least one presentation image is presented on a display device.

In one embodiment, a wavelength band ratio of a first subset of energy to a second subset of energy is determined. Based on the wavelength band ratio, it is determined that the scene depicts a particular event of a plurality of events. Information is presented on the display device that identifies the particular event.

In one embodiment, the particular event comprises a missile launch.

In one embodiment, the sensor data is processed based on the predetermined pattern using a Fourier transform to separate at least some of the energy within each corresponding wavelength band into a corresponding intensity spatial frequency range of a plurality of corresponding intensity spatial frequency ranges. A plurality of wavelength band images based on the at least some of the energy separated into the corresponding intensity spatial frequency ranges are generated. Each wavelength band image identifies spatial locations of only the at least some of the energy in the corresponding wavelength band with respect to the scene.

In one embodiment, a first wavelength band of the plurality of different wavelength bands is in a first mid-wave infrared band of wavelengths and a second wavelength band of the plurality of different wavelength bands is in a second mid-wave infrared band of wavelengths.

In one embodiment, the coded aperture is positioned at one of an entrance pupil plane of the optical system, an exit pupil plane of the optical system, and an aperture stop of the optical system.

In one embodiment, the detector array comprises a focal plane array.

In one embodiment, the coded aperture comprises a cold filter positioned with respect to a cooler assembly in which the focal plane array is positioned.

In another embodiment, an optical system is provided. The optical system includes a coded aperture comprising a plurality of wavelength filter sets arranged in a predetermined pattern. Each wavelength filter set is configured to transmit energy in a corresponding wavelength band of a plurality of different wavelength bands. The coded aperture is configured to transmit energy from a scene toward a detector array. The detector array comprises a plurality of detector elements. The detector array is configured to generate sensor data quantifying energy received by each detector element. A controller is coupled to the detector array and is configured to process the sensor data based on the predetermined pattern to identify spatial locations of energy in each corresponding wavelength band with respect to the scene.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first wavelength band" and "second wavelength band," and does not imply a priority, a type, an importance, or other attribute, unless otherwise stated herein. The term "about" used herein in conjunction with a numeric value means any value that is within a range of ten percent greater than or ten percent less than the numeric value.

The embodiments implement multispectral imaging using a coded aperture. Among other advantages, the embodiments implement mechanisms for identifying energy of particular wavelengths received from a scene, and the spatial locations within the scene of such energy, without the use of multiple sensors, such as multiple focal plane arrays, or the use of a color filter array.

The phrase "scene" refers to a real-world location that is within a field of view (FOV) of an optical device and thus from which energy that is reflected or emitted may be received or otherwise captured by the optical device. The phrase "wavelength band" refers to a particular wavelength, such as, by way of non-limiting example, 4.1 microns, or a sequence of wavelengths, such as wavelengths between about 4.0 microns and about 4.3 microns. The phrase "energy" refers to electromagnetic radiation (EMR). As will be appreciated by those of skill in the art, EMR can be expressed in terms of 1) wavelength (e.g., in nanometers or microns), 2) frequency (e.g., in Hertz), and 3) energy (e.g., in electron volts (eV)). Thus, EMR can be identified with specificity using the particular wavelength associated with the EMR, the particular frequency associated with the EMR, or the particular quantum of energy associated with the EMR.

Solely for purposes of illustration, energy will be discussed herein in the context of EMR in the infrared wavelength band, such as wavelengths between about 700 nanometers to about 1 mm, but the embodiments are not limited to the infrared band and have applicability in other bands, including the visible band and ultraviolet band.

Figure 1:
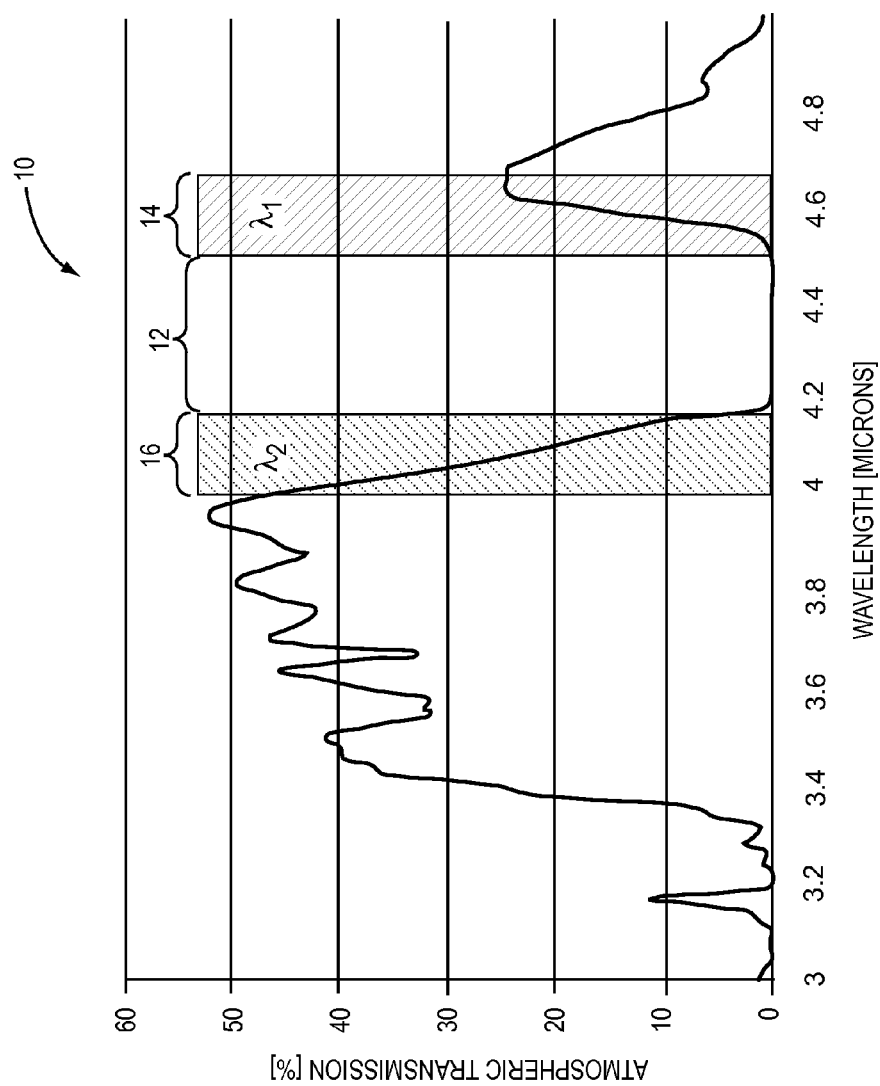
FIG. 1 is a graph illustrating atmospheric transmission of energy in the 3.0 to 4.8 micron wavelength band.

To provide context for an example system embodiment, certain aspects of the embodiments will be discussed preliminarily, followed by a comprehensive discussion of an example system embodiment. In this regard, FIG. 1 is a graph 10 illustrating the atmospheric transmission (or, inversely, atmospheric absorption) of energy in the 3.0 micron to 4.8 micron wavelength band. FIG. 1 identifies an almost complete absorption range 12 between about 4.2 microns and about 4.55 microns. Thus, energy emitted in those wavelengths in the atmosphere may not be detectable by a detector array. Energy in a first wavelength band$_{\lambda 1}$ 14 of about 4.55 microns to about 4.7 microns is at least partially transmitted in the atmosphere, and energy in a second wavelength band$_{\lambda 2}$ 16 of about 3.95 microns to about 4.2 microns is also at least partially transmitted in the atmosphere. The first wavelength band$_{\lambda 1}$ 14 and the second wavelength band$_{\lambda 2}$ 16 will be utilized herein solely for purposes of discussion, because it is known that a particular event, specifically a missile plume emitted by a launched missile, often results in the emission of energy in the first wavelength band$_{\lambda 1}$ 14 and in the second wavelength band$_{\lambda 2}$ 16. Thus, an ability to detect such energy and identify the spatial location of such energy with respect to a scene is useful for identifying an occurrence of a missile launch and a location of the missile launch.

Figure 2:
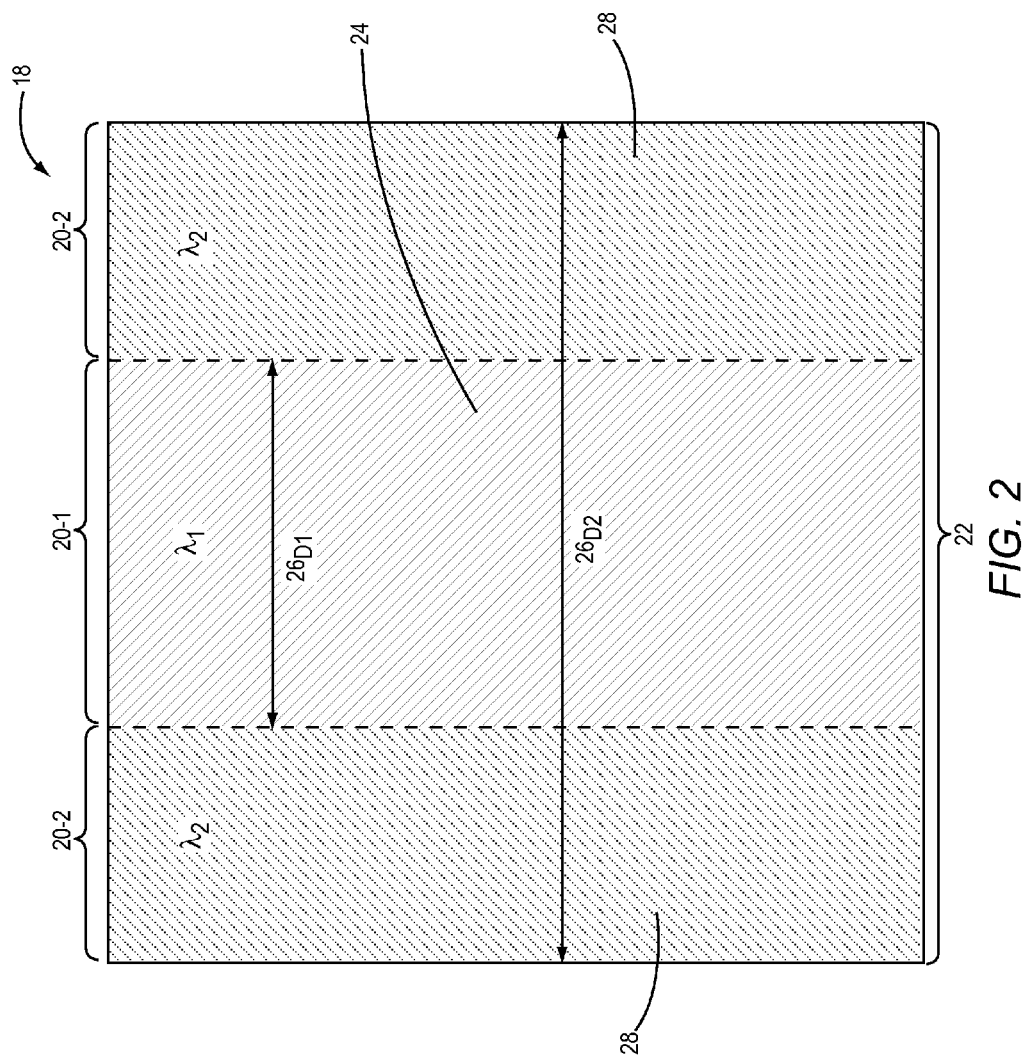
FIG. 2 is a block diagram of a coded aperture according to one embodiment.

FIG. 2 is a block diagram of a coded aperture 18 according to one embodiment. The coded aperture 18 includes a plurality of wavelength filter sets 20-1 and 20-2 (generally, wavelength filter sets 20) arranged in a predetermined pattern 22. Each of the wavelength filter sets 20 is configured to transmit energy in a corresponding wavelength band of a plurality of different wavelength bands. In this example, the wavelength filter set 20-1 is configured to transmit energy in the corresponding first wavelength band$_{\lambda 1}$ 14 (FIG. 1) and to block transmission of energy in other wavelengths, and the wavelength filter set 20-2 is configured to transmit energy in the corresponding second wavelength band$_{\lambda 2}$ 16 (FIG. 1) and to block transmission of energy in other wavelengths. The use of the phrase "transmit" in this context includes passive transmission, such that energy passing through the coded aperture 18 is said to be "transmitted" by the coded aperture 18.

The wavelength filter set 20-1 comprises a single filter 24 that forms a stripe from a top of the coded aperture 18 to a bottom of the coded aperture 18 and having a width $26_{D1}$. The wavelength filter set 20-2 comprises two filters 28 that form stripes from the top of the coded aperture 18 to the bottom of the coded aperture 18 on either side of the wavelength filter set 20-1. A width $26_{D2}$ identifies the total width of the coded aperture 18.

Figure 3:
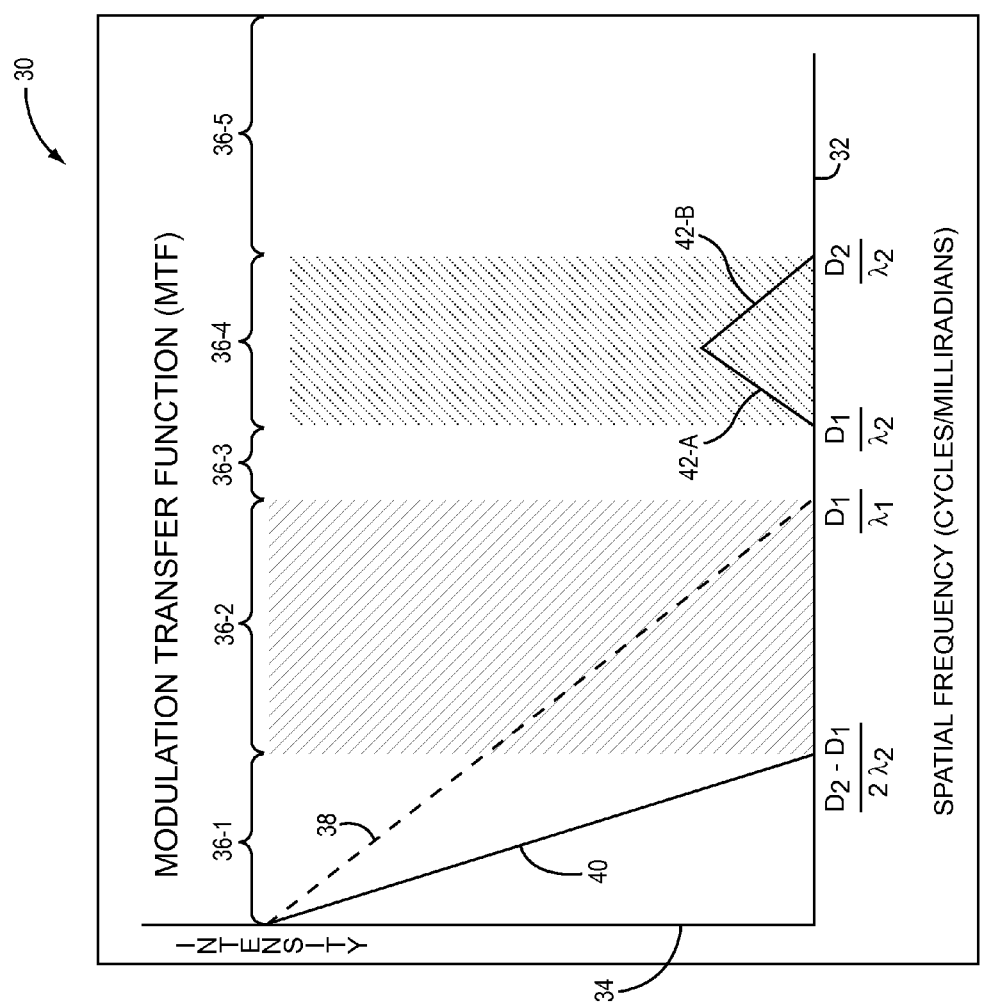
FIG. 3 is a graph illustrating the modulation transfer function of the coded aperture illustrated in FIG. 2.

FIG. 3 is a graph 30 illustrating the modulation transfer function (MTF) of the coded aperture 18 illustrated in FIG. 2. The MTF of the coded aperture 18 is the magnitude response of the coded aperture 18 to sinusoids of different spatial frequencies. Determining the MTF of an optical element, such as the coded aperture 18, is known to those of skill in the art and will not be discussed in detail herein. The MTF can be used to identify at which intensity spatial frequencies the energy from a scene may be located. The graph 30 identifies the spatial frequency of energy along the x-axis 32 and the normalized amplitude, or intensity, of the energy along the y-axis 34. The x-axis 32 can be segmented into a plurality of intensity spatial frequency ranges 36-1-36-5 (generally, intensity spatial frequency ranges 36). Each of the intensity spatial frequency ranges 36 comprises a range of spatial frequencies of energy.

A line 38 indicates that the intensity spatial frequency ranges 36-1-36-2 can include energy from the first wavelength band$_{\lambda 1}$ 14. A line 40 indicates that the intensity spatial frequency range 36-1 can also include energy from the second wavelength band$_{\lambda 2}$ 16, but energy from the second wavelength band$_{\lambda 2}$ 16 will not be located in the intensity spatial frequency range 36-2. Thus, the intensity spatial frequency range 36-1 could include energy from both the first wavelength band$_{\lambda 1}$ 14 and the second wavelength band$_{\lambda 2}$ 16, while the intensity spatial frequency range 36-2 can include energy from only the first wavelength band$_{\lambda 1}$ 14.

Line segments 42-A and 42-B indicate that the intensity spatial frequency range 36-4 can contain only energy from the second wavelength band$_{\lambda 2}$ 16. Collectively, the lines 38 and 40, and the line segments 42-A-42-B indicate that the intensity spatial frequency ranges 36-3 and 36-5 will not contain energy from either the first wavelength band$_{\lambda 1}$ 14 or the second wavelength band$_{\lambda 2}$ 16.

Figure 4:
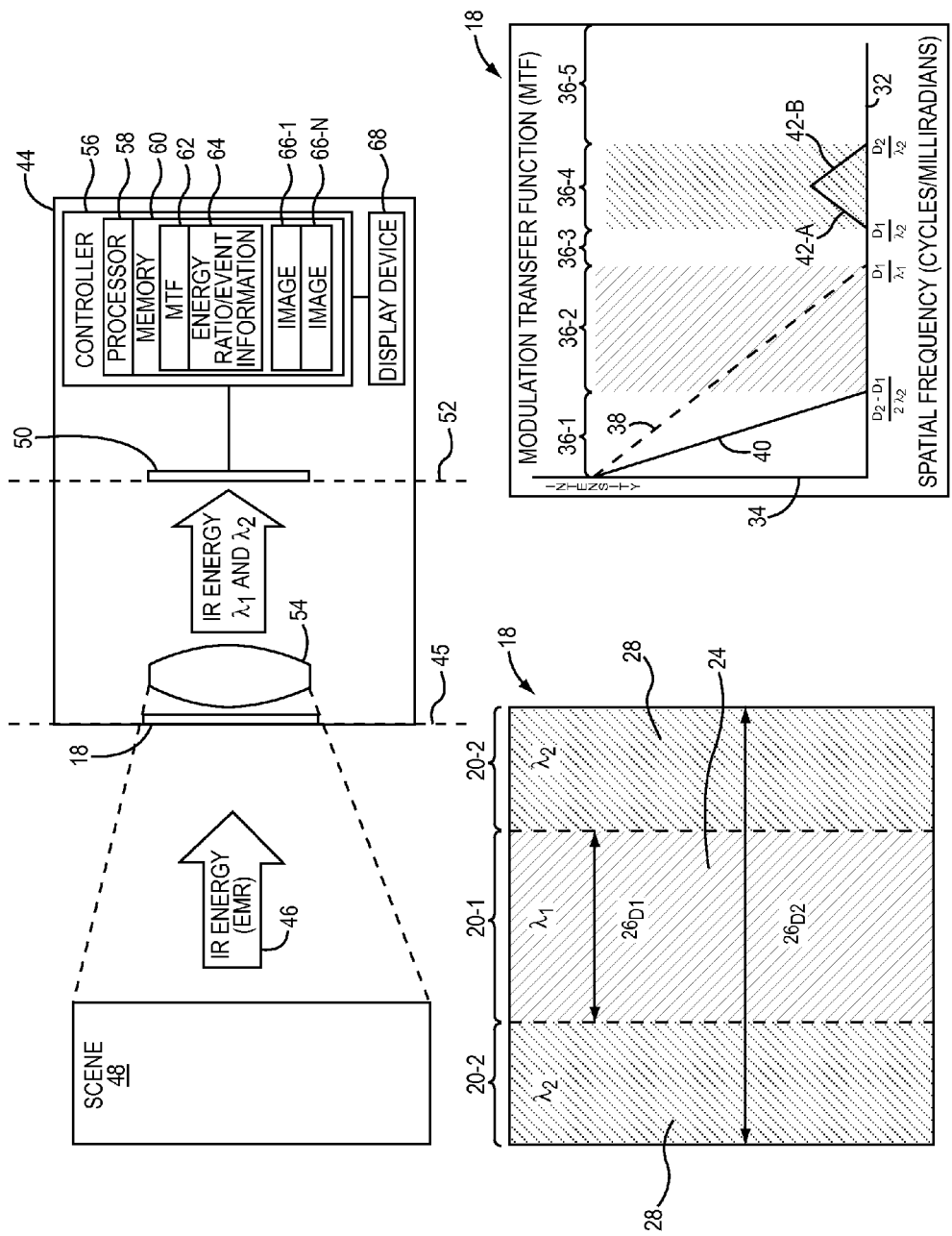
FIG. 4 is a block diagram of an optical system according to one embodiment.

With this context, FIG. 4 is a block diagram of an optical system 44 according to one embodiment. The optical system 44 includes the coded aperture 18 positioned at an entrance pupil plane 45 of the optical system 44. Energy 46 from a scene 48 is received by the coded aperture 18. While, for purposes of illustration, in this example the energy 46 is energy in the infrared (IR) wavelength band, the embodiments are not limited to operating in the IR wavelength band. The scene 48 comprises a portion of the real world that is within an FOV of the optical system 44. The coded aperture 18 transmits energy in the first wavelength band$_{\lambda 1}$ 14 and energy in the second wavelength band$_{\lambda 2}$ 16 toward a detector array 50. The detector array 50 is positioned at an image plane 52 and comprises a plurality of detector elements (not illustrated) that are sensitive to energy in the IR wavelength band. One or more lenses 54 focus the energy in the first wavelength band$_{\lambda 1}$ 14 and the energy in the second wavelength band$_{\lambda 2}$ 16 onto the detector array 50.

The detector array 50 generates sensor data that quantifies the energy received by each detector element. The sensor data is provided to a controller 56 for processing, as will be discussed in greater detail herein. In one embodiment, the controller 56 may include a processor 58 and a memory 60. The processor 58 may be a general-purpose processor or a proprietary special-purpose processor. In some embodiments, the controller 56 may be implemented in a field-programmable gate array or in an application-specific integrated circuit. The memory 60 may include an MTF 62 that corresponds to the coded aperture 18. The memory 60 may also include energy ratio/event information 64 that correlates real-world events that may occur in a scene to the ratio of received energy in the first wavelength band$_{\lambda 1}$ 14 to received energy in the second wavelength band$_{\lambda 2}$ 16. The memory 60 may also include one or more wavelength band images 66-1-66-N, which comprise images of the energy received in a particular wavelength band, which may be generated based on the sensor data, as described in greater detail herein. The optical system 44 may include or be coupled to a display device 68 that may be used to present information to an operator, such as a pilot of an aircraft.

Figure 5:
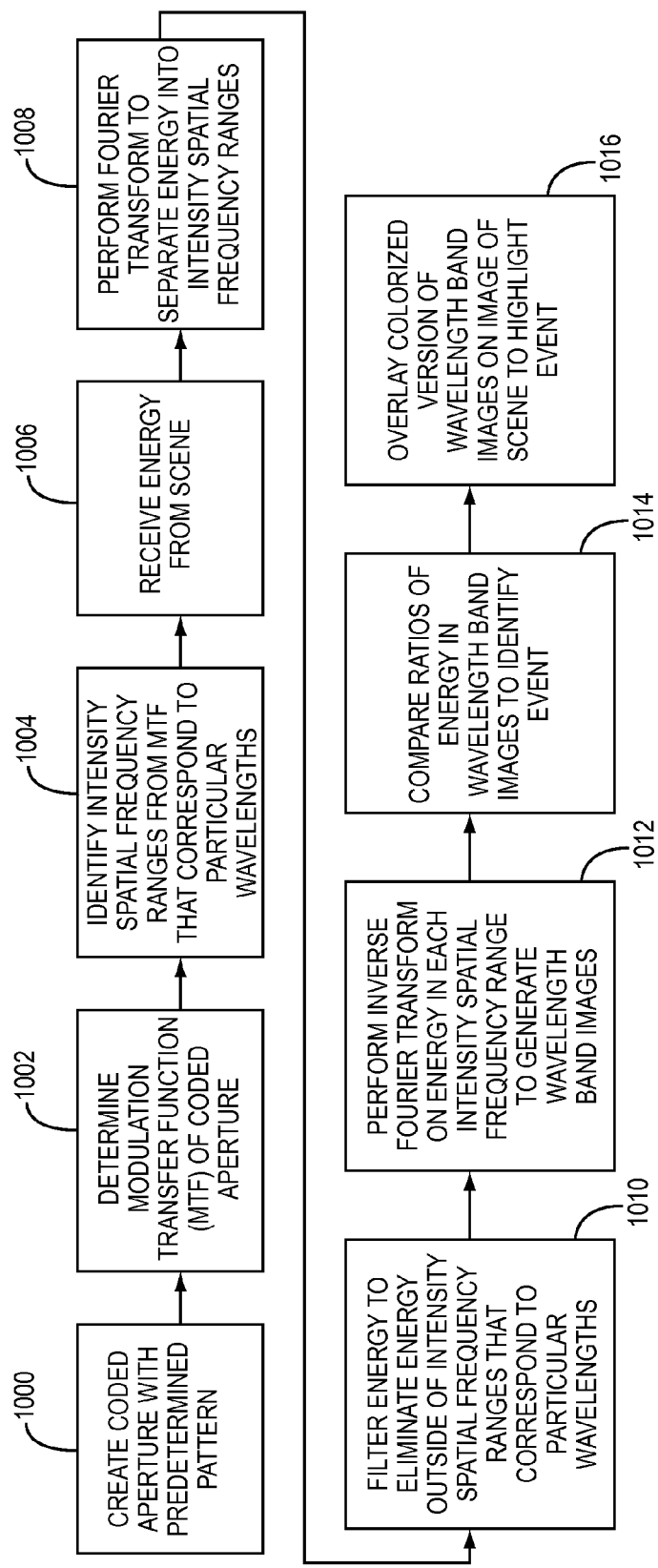
FIG. 5 is a flow diagram illustrating a process for identifying energy received from a scene according to one embodiment.

FIG. 5 is a flow diagram illustrating a process for identifying energy received from the scene 48 according to one embodiment. FIG. 5 will be discussed in conjunction with FIG. 4. The coded aperture 18 is created with the predetermined pattern 22 (FIG. 5, block 1000) and positioned at a desired location within the optical system 44. While, for purposes of illustration, the predetermined pattern 22 is a striped pattern and comprises only two wavelength bands, the embodiments are not so limited. Any number of different patterns, including radial patterns, may be used to facilitate separation of energy in any number of wavelength bands.

Based on the predetermined pattern 22, the MTF 62 of the coded aperture 18 is determined and stored, for example, in the memory 60 (FIG. 5, block 1002). For each of the first wavelength band$_{\lambda 1}$ 14 and the second wavelength band$_{\lambda 2}$ 16, a corresponding intensity spatial frequency range 36 of the plurality of different intensity spatial frequency ranges 36-1-36-5 is identified (FIG. 5, block 1004). The corresponding intensity spatial frequency range 36 that is identified is based on the particular intensity spatial frequency range 36 that contains only energy from the corresponding wavelength band. Thus, for the first wavelength band$_{\lambda 1}$ 14, the corresponding intensity spatial frequency range 36-2 is identified, and for the second wavelength band$_{\lambda 2}$ 16, the corresponding intensity spatial frequency range 36-4 is identified.

The optical system 44 receives the energy 46 from the scene 48 (FIG. 5, block 1006). The coded aperture 18 transmits the energy in the first wavelength band$_{\lambda 1}$ 14 and the second wavelength band$_{\lambda 2}$ 16 toward the detector array 50. The detector array 50 receives the energy in the first wavelength band$_{\lambda 1}$ 14 and the second wavelength band$_{\lambda 2}$ 16 and generates sensor data that quantifies energy received by each detector element. Because the coded aperture 18 does not physically abut the detector array 50, energy from both the first wavelength band$_{\lambda 1}$ 14 and the second wavelength band$_{\lambda 2}$ 16 may be received by any of the detector elements.

The controller 56 receives the sensor data. The controller 56 performs a Fourier Transform on the sensor data to identify corresponding subsets of the energy within the intensity spatial frequency ranges 36-1-36-5 (FIG. 5, block 1008). The energy may then be filtered to eliminate energy outside of the intensity spatial frequency range 36-2 and the intensity spatial frequency range 36-4 (FIG. 5, block 1010). Filtering out such energy leaves two subsets of energy, a first subset of energy that is within the intensity spatial frequency range 36-2 and which comprises energy within only the first wavelength band$_{\lambda 1}$ 14, and a second subset of energy that is within the intensity spatial frequency range 36-4 and which comprises energy within only the second wavelength band$_{\lambda 2}$ 16.

An inverse Fourier Transform translates from the spatial frequency domain to the spatial domain. Thus, an inverse Fourier Transform may then be performed on each subset of energy to generate one or more wavelength band images 66 that identify spatial locations of the corresponding subsets of the energy with respect to the scene 48 (FIG. 5, block 1012). Each wavelength band image 66 identifies the particular locations of the energy within the scene 48. Thus, the wavelength band image 66 that corresponds to the subset of energy in the intensity spatial frequency range 36-2 identifies the locations in the scene 48 of energy within the first wavelength band$_{\lambda 1}$ 14, and the wavelength band image that corresponds to the subset of energy in the intensity spatial frequency range 36-4 identifies the locations in the scene 48 of energy within the second wavelength band$_{\lambda 2}$ 16.

In the example discussed herein, energy within the first wavelength band$_{\lambda 1}$ 14 that is in close proximity to energy within the second wavelength band$_{\lambda 2}$ 16 may be indicative of a missile plume. In one embodiment, a missile plume has a predetermined signature, which can be expressed in terms of a ratio of energy within the first wavelength band$_{\lambda 1}$ 14 to energy within the second wavelength band$_{\lambda 2}$ 16. In one embodiment, the controller 56 may compare the wavelength band images 66 to one another to determine a wavelength band ratio of energy within the first wavelength band$_{\lambda 1}$ 14 to energy within the second wavelength band$_{\lambda 2}$ 16. The controller 56 accesses the energy ratio/event information 64 and compares the wavelength band ratio of the energy within the first wavelength band$_{\lambda 1}$ 14 to the energy within the second wavelength band$_{\lambda 2}$ 16 to the energy ratio/event information 64 to determine if a missile plume exists in the scene 48 (FIG. 5, block 1014). This is desirable because other events may also cause the presence of the energy within the first wavelength band$_{\lambda 1}$ 14 to be in close proximity to the energy within the second wavelength band$_{\lambda 2}$ 16, such as a reflection of the sun off of a reflective surface. Comparing the wavelength band ratio to the energy ratio/event information 64 can facilitate the correct identification of a missile plume versus a reflection of the sun in the scene 48. In one embodiment, the controller 56 may generate information that identifies the event and present such information on the display device 68. Such information may be contained, for example, in the energy ratio/event information 64.

In one embodiment, the controller 56 may generate colorized versions of one or more of the wavelength band images and present the colorized versions on the display device 68. Generating a colorized version may comprise translating the image data from the first wavelength band$_{\lambda 1}$ 14 and/or the second wavelength band$_{\lambda 2}$ 16 to a wavelength perceivable by the human eye.

In one embodiment, the controller 56 may generate colorized versions of one or more of the wavelength band images and overlay the colorized versions on top of real-time video imagery of the scene 48, and present such overlaid real-time video imagery of the scene 48 on the display device 68 to highlight the event (FIG. 5, block 1016).

In other embodiments, rather than presenting imagery to an operator, certain actions may be taken based on the wavelength band images. For example, in the context of an aircraft, the wavelength band images may be analyzed using a joint histogram, and based on the analysis, line-of-sight angles to a target may be determined. Alternatively, the aircraft may deploy chaff upon determining the occurrence of a missile launch.

Figure 6A:
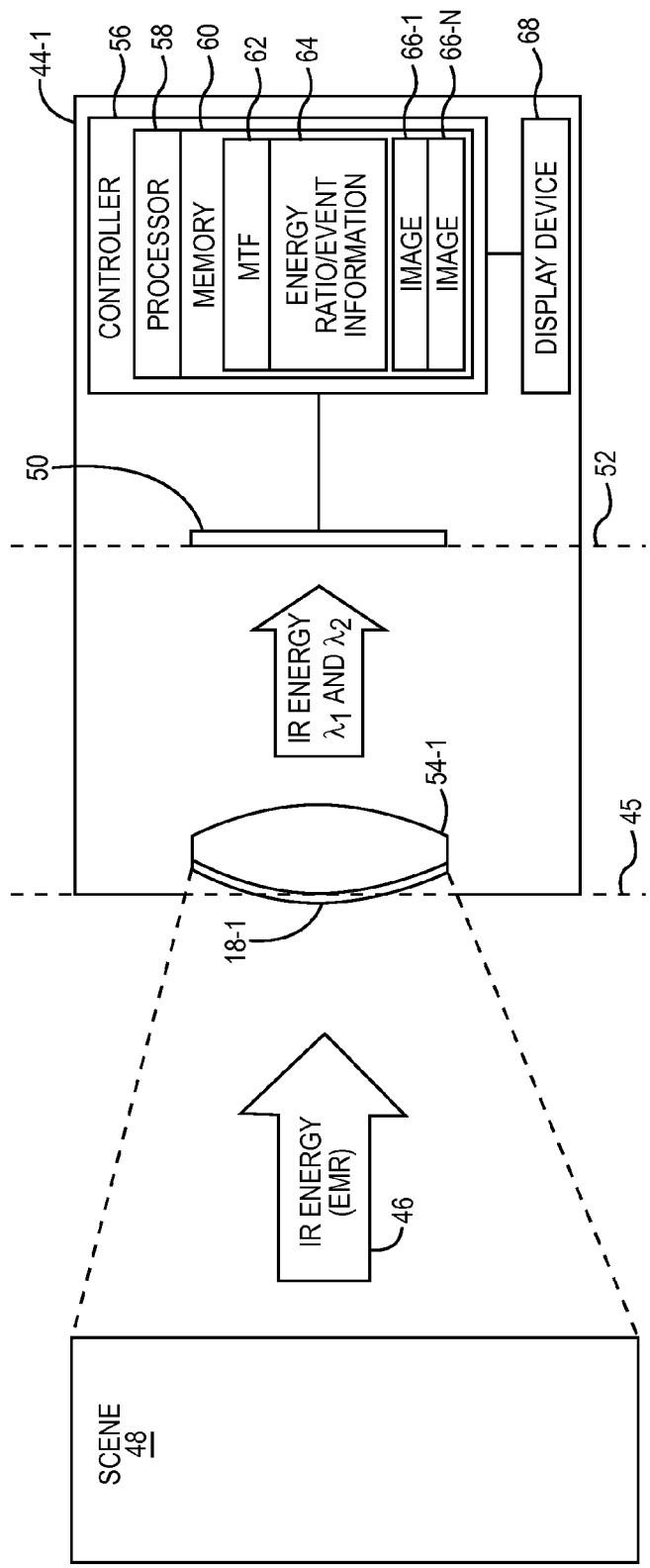
FIGS. 6A-6C are block diagrams of optical systems according to other embodiments.

FIG. 6A is a block diagram of an optical system 44-1 according to another embodiment. In this embodiment, a coded aperture 18-1 is a coating on a lens 54-1 positioned at the pupil plane 45. In another embodiment, the coded aperture 18-1 comprises a flexible material that is applied to the lens 54-1.

Figure 6B:
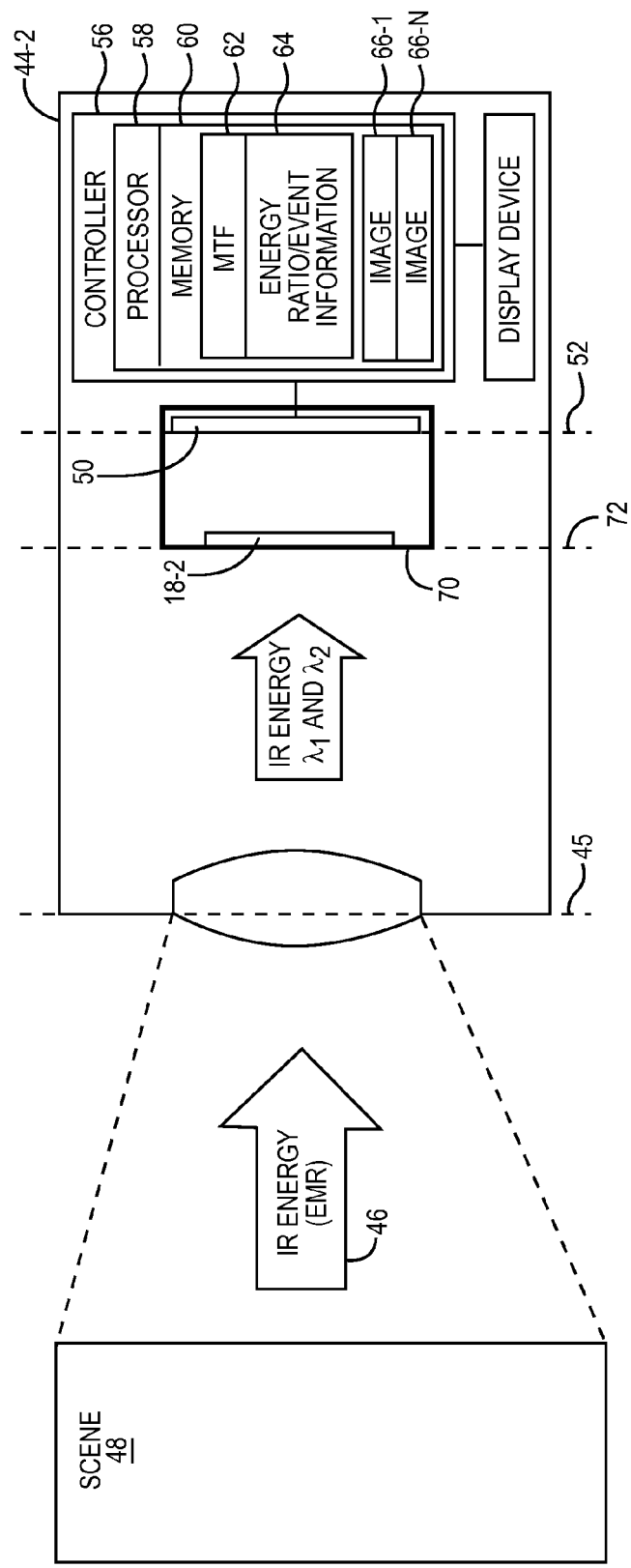

FIG. 6B is a block diagram of an optical system 44-2 according to another embodiment. In this embodiment, the detector array 50 comprises a focal plane array and is maintained inside a cooler assembly 70. A coded aperture 18-2 is in the form of a cold filter and is also maintained in the cooler assembly 70 at an exit pupil plane 72.

Figure 6C:
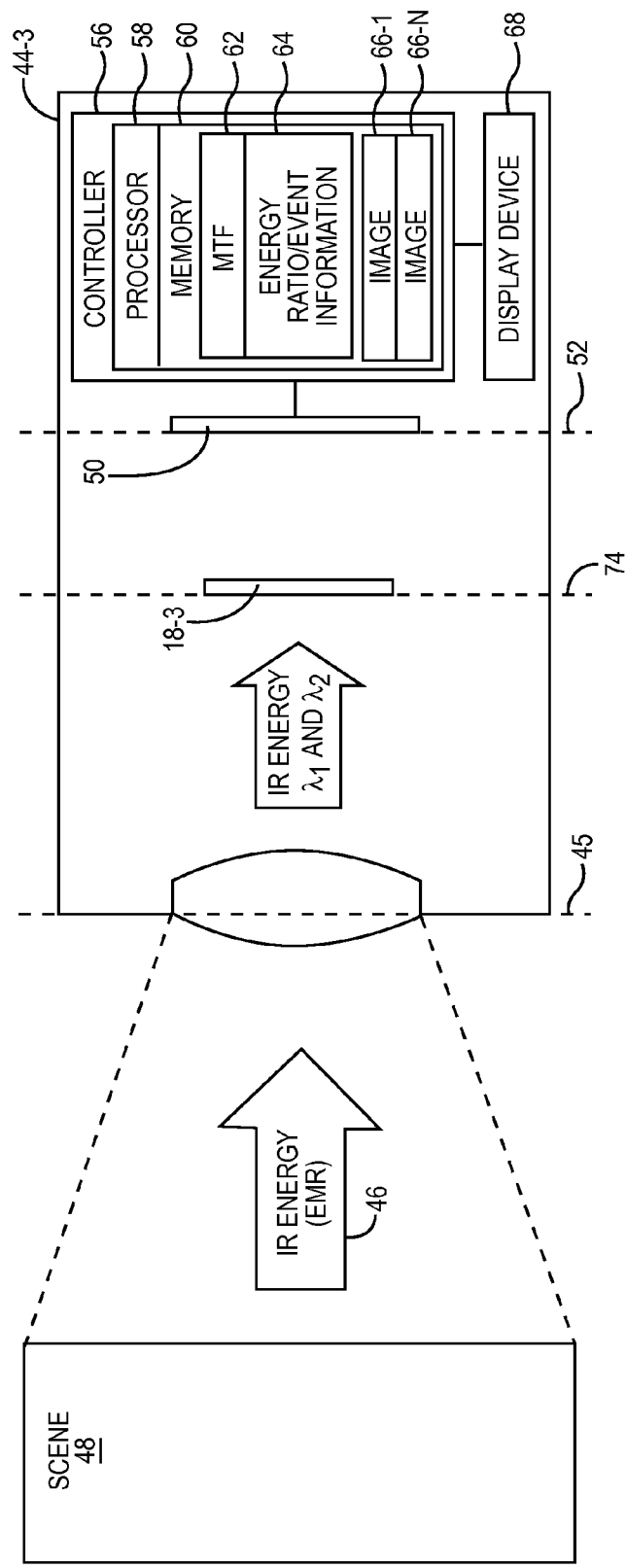

FIG. 6C is a block diagram of an optical system 44-3 according to another embodiment. In this embodiment, a coded aperture 18-3 is positioned at an aperture stop plane 74. Thus, collectively, FIGS. 4 and 6A-6C provide example planes at which the coded apertures 18-18-3 may be positioned.

Figure 7:
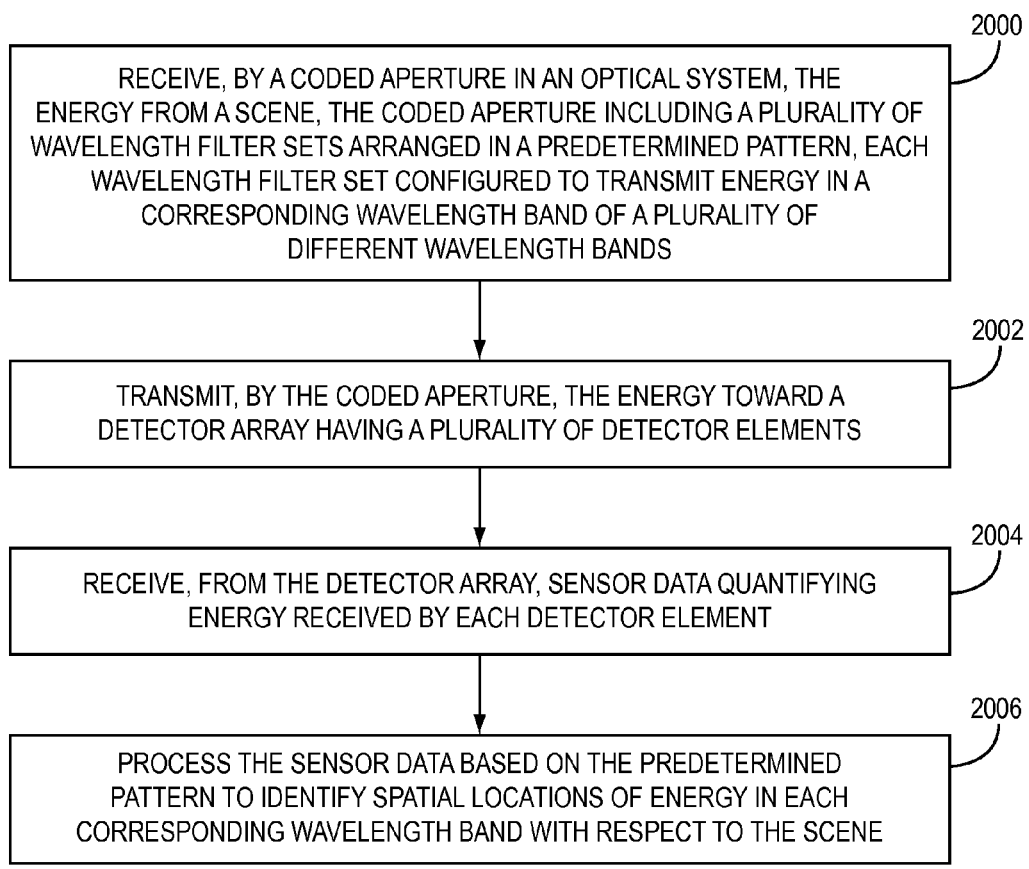
FIG. 7 is a flowchart of a method for identifying energy received from the scene according to one embodiment.

FIG. 7 is a flowchart of a method for identifying energy received from the scene 48 according to one embodiment and will be discussed in conjunction with FIG. 4. The coded aperture 18 receives the energy 46 from the scene 48. The coded aperture 18 comprises the plurality of wavelength filter sets 20-1, 20-2 arranged in the predetermined pattern 22. Each wavelength filter set 20 is configured to transmit energy in a corresponding wavelength band of a plurality of different wavelength bands (FIG. 7, block 2000). In particular, the wavelength filter set 20-1 is configured to transmit energy in the corresponding first wavelength band$_{\lambda 1}$ 14 and to block transmission of energy in other wavelengths bands, and the wavelength filter set 20-2 is configured to transmit energy in the corresponding second wavelength band$_{\lambda 2}$ 16 and to block transmission of energy in other wavelength bands.

The coded aperture 18 transmits the energy in the corresponding first wavelength band$_{\lambda 1}$ 14 and the corresponding second wavelength band$_{\lambda 2}$ 16 toward the detector array 50 (FIG. 7, block 2002). The detector array 50 comprises a plurality of detector elements. The controller 56 receives, from the detector array 50, sensor data that quantifies energy received by each detector element in the corresponding first wavelength band$_{\lambda 1}$ 14 and the corresponding second wavelength band$_{\lambda 2}$ 16 (FIG. 7, block 2004). The controller 56 processes the sensor data based on the predetermined pattern 22 to identify spatial locations of the energy in the first wavelength band$_{\lambda 1}$ 14 and the energy in the second wavelength band$_{\lambda 2}$ 16 with respect to the scene 48 (FIG. 7, block 2006).

Figure 8:
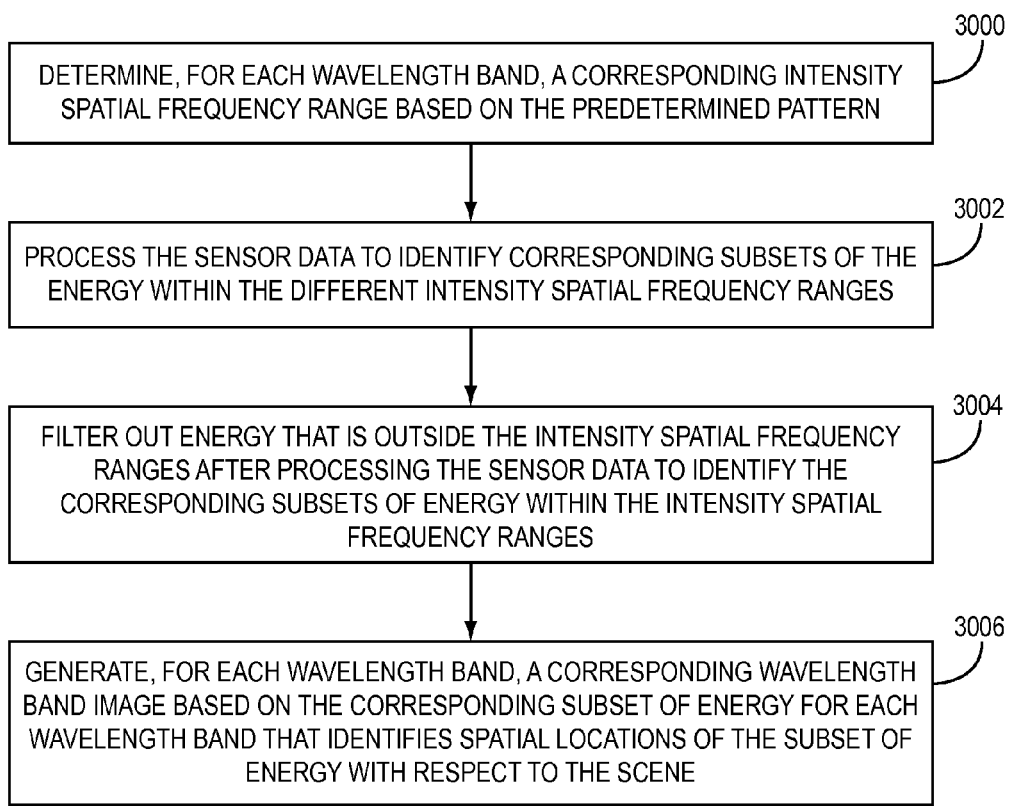
FIG. 8 is a flowchart of a method for processing sensor data based on a predetermined pattern to identify spatial locations of energy in a plurality of wavelength bands with respect to a scene, according to one embodiment.

FIG. 8 is a flowchart of a method for processing the sensor data based on the predetermined pattern 22 to identify spatial locations of the energy in the first wavelength band$_{\lambda 1}$ 14 and the energy in the second wavelength band$_{\lambda 2}$ 16 with respect to the scene 48, as discussed above with regard to block 2006 of FIG. 7 in greater detail. The controller 56 determines, for the first wavelength band$_{\lambda 1}$ 14 and the second wavelength band$_{\lambda 2}$ 16, the corresponding intensity spatial frequency range 36 of the plurality of intensity spatial frequency ranges 36-1-36-5 based on the predetermined pattern 22 (FIG. 8, block 3000). In particular, the controller 56 utilizes the MTF 62 that corresponds to the predetermined pattern 22 to identify the corresponding intensity spatial frequency range 36. In this example, the corresponding intensity spatial frequency ranges 36 include the intensity spatial frequency ranges 36-2 and 36-4, respectively.

The controller 56 processes the sensor data to identify corresponding subsets of the energy within the different intensity spatial frequency ranges 36-2, 36-4 (FIG. 8, block 3002). The controller 56 filters out energy that is outside the corresponding intensity spatial frequency ranges 36-2, 36-4 (FIG. 8, block 3004).

The controller 56 generates, for the first wavelength band$_{\lambda 1}$ 14 and the second wavelength band$_{\lambda 2}$ 16, corresponding wavelength band images based on the corresponding subsets of energy for the first wavelength band$_{\lambda 1}$ 14 and the second wavelength band$_{\lambda 2}$ 16 that identify spatial locations of the corresponding subsets of energy with respect to the scene 48 (FIG. 8, block 3006).

Figure 9A:
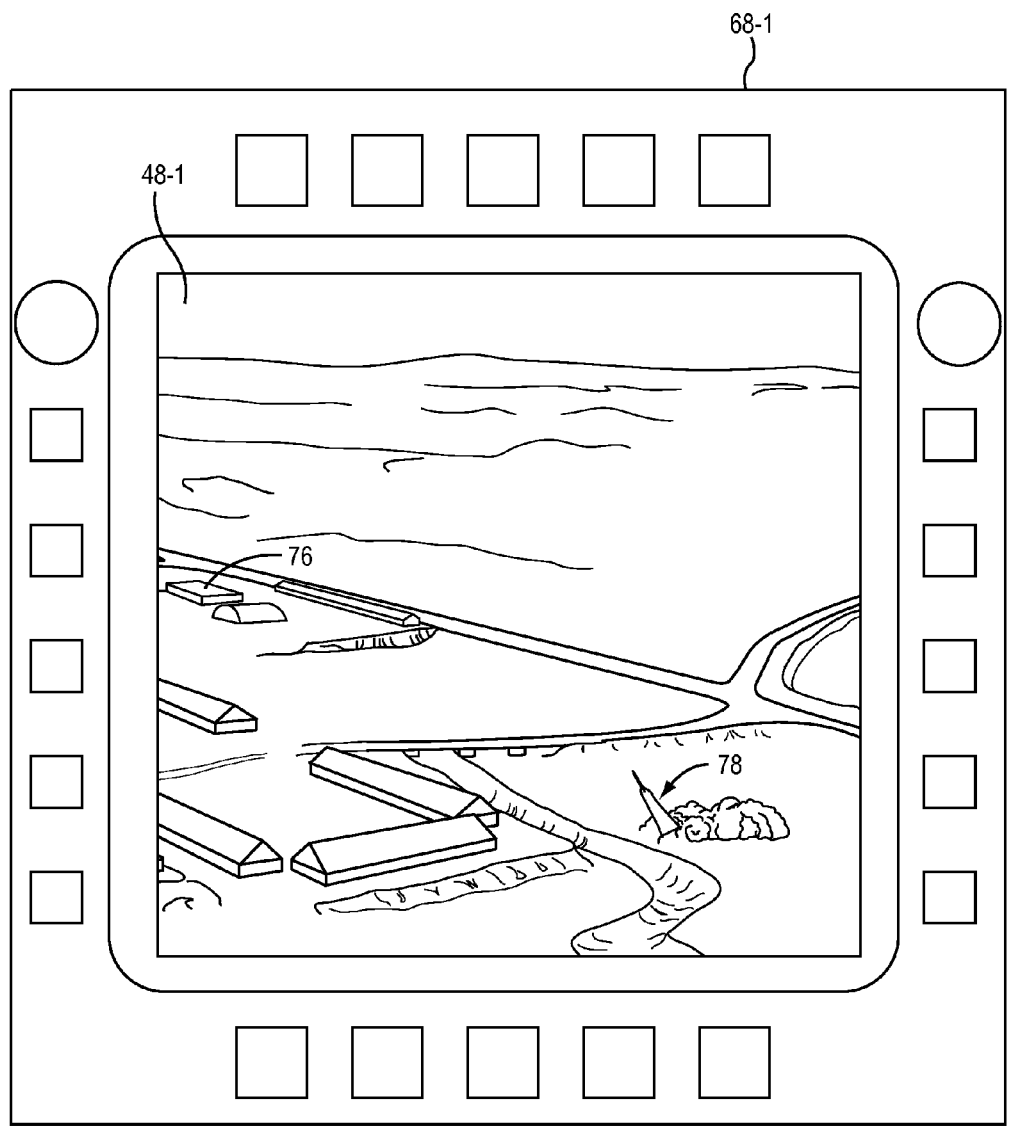
FIGS. 9A-9C are diagrams illustrating an example application of the embodiments.
Figure 9B:
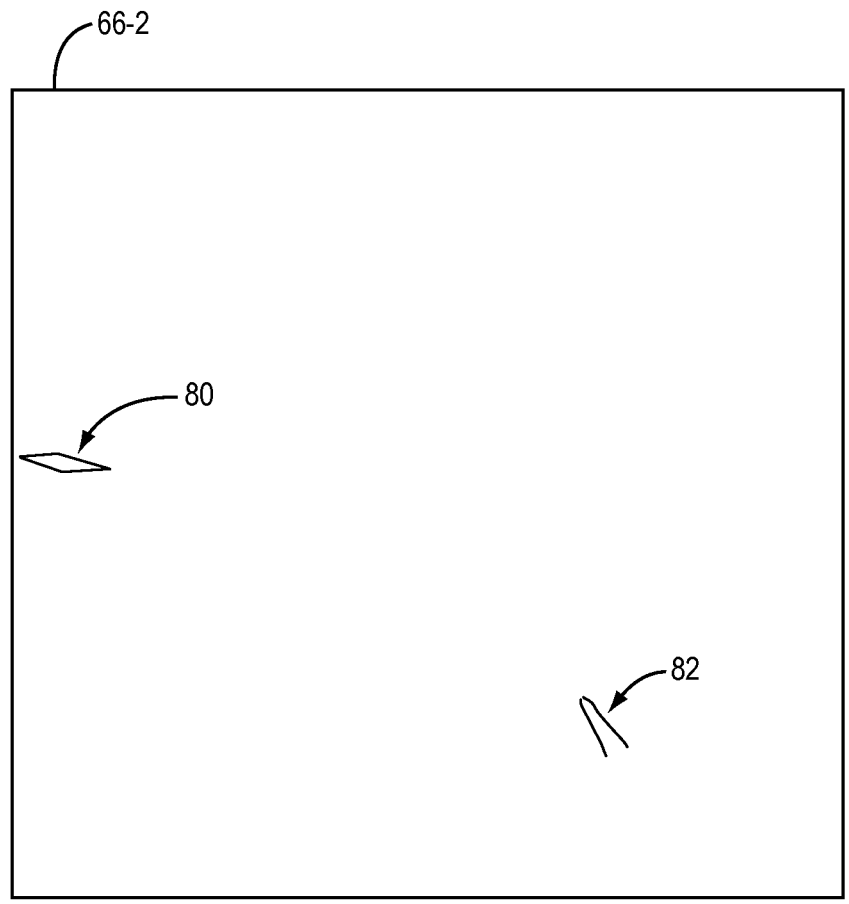
Figure 9C:
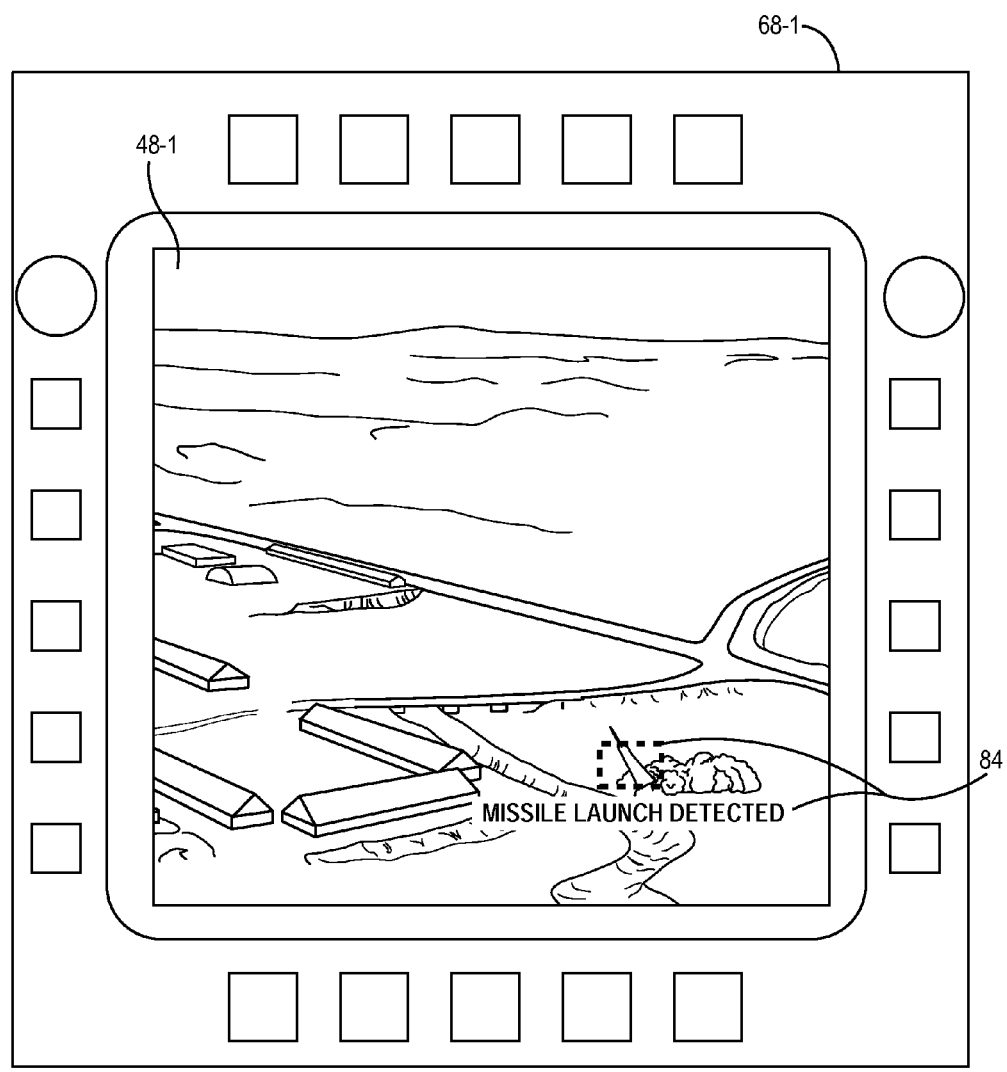

FIGS. 9A-9C are diagrams illustrating an example application of the embodiments. FIGS. 9A-9C will be discussed in conjunction with FIG. 4. Referring first to FIG. 9A, assume that the optical system 44 (FIG. 4) includes the elements discussed above, as well as a separate and co-aligned visible spectrum camera that generates real-time video of a scene 48-1 and displays such video on a display device 68-1 to a flight crew operating an aircraft. Among other objects in the scene 48-1, a roof 76 of a building exists in the scene 48-1, and a missile plume 78 associated with a missile exists in the scene 48-1.

Concurrently with the generation of the real-time video, the optical system 44 also continually receives infrared energy from the scene 48-1 and performs the processes described above with regard to FIGS. 7 and 8 to identify spatial locations of energy in the first wavelength band$_{\lambda 1}$ 14 and energy in the second wavelength band$_{\lambda 2}$ 16 with respect to the scene 48-1. FIG. 9B illustrates a composite wavelength band image 66-2 derived from the spatial locations of energy in the first wavelength band$_{\lambda 1}$ 14 and energy in the second wavelength band$_{\lambda 2}$ 16. The composite wavelength band image 66-2 identifies energy in the first wavelength band$_{\lambda 1}$ 14 and energy in the second wavelength band$_{\lambda 2}$ 16 as existing at locations 80 and 82, which coincide with the locations of the roof 76 of the building and the missile plume 78. The controller 56 determines, for each respective location 80, 82, a wavelength band ratio of the energy in the first wavelength band$_{\lambda 1}$ 14 to the energy in the second wavelength band$_{\lambda 2}$ 16. The controller 56 accesses the energy ratio/event information 64 and determines that the ratio of energy in the first wavelength band$_{\lambda 1}$ 14 to the energy in the second wavelength band$_{\lambda 2}$ 16 at the location 80 is consistent with a solar reflection. The controller 56 determines that the ratio of energy in the first wavelength band$_{\lambda 1}$ 14 to the energy in the second wavelength band$_{\lambda 2}$ 16 at the location 82 is consistent with a missile plume.

The controller 56 generates information for integration with the real-time video presented on the display device 68-1 to notify the flight crew of the presence of the missile plume 78. FIG. 9C illustrates information 84 that highlights, to the crew of the aircraft, the missile plume 78.

Among other advantages, the embodiments achieve multispectral imaging capabilities in a relatively low-cost manner. While the embodiments have been discussed herein in the context of a mid-wave IR detector array, the embodiments are applicable to detector arrays of any wavelengths, including long-wave IR and short-wave IR, which may be implemented in a focal plane array, as well as visible spectrum detector arrays, such as complementary metal-oxide semiconductor (CMOS) and charge-coupled device (CCD) detector arrays. Moreover, while the embodiments illustrate a simple two-wavelength coded aperture 18, the embodiments are not so limited and have applicability to any number of wavelengths. Also, while the embodiments are discussed in terms of wavelengths, the embodiments also apply to polarized energy. In such embodiments, the coded aperture may comprise multiple polarized filter sets, each of which passes energy having a particular polarization state, such as vertical, horizontal, or the like. The polarization state of the energy received by the detector array may then be decoded via processing with a fast Fourier transform (FFT) in order to identify the polarization of the energy received from the scene.

While, for purposes of illustration, the embodiments have been described with the use of a one-dimensional FFT, in other embodiments, a two-dimensional FFT may be desired to maintain full aperture resolution. The embodiments may be implemented in any number of applications, including, by way of non-limiting example, chemical detection and disturbed earth detection (to detect, for example, buried improvised explosive devices).

Those skilled in the art will recognize improvements and modifications to the preferred embodiments of the disclosure. All such improvements and modifications are considered within the scope of the concepts disclosed herein and the claims that follow.

What is claimed is:

1. A method for identifying energy received from a scene, comprising:
   receiving, by a coded aperture in an optical system, the energy from the scene, the coded aperture positioned at one of an entrance pupil plane of the optical system, an exit pupil plane of the optical system, and an aperture stop plane of the optical system and comprising a plurality of wavelength filter sets arranged in a predetermined pattern, each wavelength filter set configured to transmit energy in a corresponding wavelength band of a plurality of different wavelength bands;
   transmitting, by the coded aperture, the energy in the corresponding wavelength bands toward a detector array comprising a plurality of detector elements, at least some individual detector elements of the plurality of detector elements receiving energy in each of the corresponding wavelength bands;
   receiving, from the detector array, sensor data quantifying energy received by each detector element; and
   processing the sensor data based on the predetermined pattern to identify spatial locations of energy in each corresponding wavelength band with respect to the scene.

2. The method of claim 1, wherein processing the sensor data based on the predetermined pattern to identify the spatial locations of the energy in each corresponding wavelength band with respect to the scene, further comprises:
   determining, for each wavelength band of the plurality of different wavelength bands, a corresponding intensity spatial frequency range of a plurality of different intensity spatial frequency ranges based on the predetermined pattern;
   processing the sensor data to identify corresponding subsets of the energy within the different intensity spatial frequency ranges; and
   generating, for each wavelength band, a corresponding wavelength band image of a plurality of wavelength band images based on the corresponding subset of energy for each wavelength band that identifies spatial locations of the subset of energy with respect to the scene.

3. The method of claim 2, further comprising:
   filtering out energy that is outside the intensity spatial frequency ranges after processing the sensor data to identify the corresponding subsets of energy within the intensity spatial frequency ranges.

4. The method of claim 2, wherein generating, for each wavelength band, the corresponding wavelength band image based on the corresponding subset of energy comprises processing, for each respective wavelength band, the corresponding subset of energy with an inverse Fourier transform to generate the corresponding wavelength band image that identifies the spatial locations of the subset of energy with respect to the scene.

5. The method of claim 4, further comprising:
generating at least one presentation image based on one or more of the corresponding wavelength band images, the at least one presentation image comprising colorized data configured to be visible to a human eye that identifies the spatial locations of the subsets of energy of the one or more corresponding wavelength band images; and
presenting the at least one presentation image on a display device.

6. The method of claim 5, further comprising:
determining a wavelength band ratio of a first subset of energy to a second subset of energy;
based on the wavelength band ratio, determining that the scene depicts a particular event of a plurality of events; and
presenting information on the display device that identifies the particular event.

7. The method of claim 6, wherein the particular event comprises a missile launch.

8. The method of claim 1, wherein processing the sensor data based on the predetermined pattern to identify the spatial locations of energy further comprises:
processing the sensor data based on the predetermined pattern using a Fourier transform to separate at least some of the energy within each corresponding wavelength band into a corresponding intensity spatial frequency range of a plurality of corresponding intensity spatial frequency ranges; and
generating a plurality of wavelength band images based on the energy separated into the corresponding intensity spatial frequency ranges, each wavelength band image identifying the spatial locations of only the energy in the corresponding wavelength band with respect to the scene.

9. The method of claim 1, wherein a first wavelength band of the plurality of different wavelength bands is in a first mid-wave infrared band of wavelengths, and wherein a second wavelength band of the plurality of different wavelength bands is in a second mid-wave infrared band of wavelengths.

10. The method of claim 1, wherein the predetermined pattern comprises a plurality of vertical stripes that extend from a top of the coded aperture to a bottom of the coded aperture.

11. The method of claim 1, wherein the detector array comprises a focal plane array.

12. The method of claim 11, wherein the coded aperture comprises a cold filter positioned with respect to a cooler assembly in which the focal plane array is positioned.

13. An optical system, comprising:
a coded aperture comprising a plurality of wavelength filter sets arranged in a predetermined pattern, each wavelength filter set configured to transmit energy in a corresponding wavelength band of a plurality of different wavelength bands, the coded aperture configured to receive energy from a scene and transmit the energy in the corresponding wavelength bands toward a detector array, the coded aperture being positioned at a plane in the optical system that is not an image plane;
the detector array comprising a plurality of detector elements, the detector array configured to generate sensor data quantifying energy received by each detector element, at least some individual detector elements of the plurality of detector elements configured to receive energy in each of the corresponding wavelength bands; and
a controller coupled to the detector array, the controller configured to process the sensor data based on the predetermined pattern to identify spatial locations of energy in each corresponding wavelength band with respect to the scene.

14. The optical system of claim 13, wherein to process the sensor data based on the predetermined pattern to identify the spatial locations of the energy in each corresponding wavelength band with respect to the scene, the controller is further configured to:
determine, for each wavelength band of the plurality of different wavelength bands, a corresponding intensity spatial frequency range of a plurality of different intensity spatial frequency ranges based on the predetermined pattern;
process the sensor data to identify corresponding subsets of the energy within the different intensity spatial frequency ranges; and
generate, for each wavelength band, a corresponding wavelength band image of a plurality of wavelength band images based on the corresponding subset of energy for each wavelength band that identifies spatial locations of the subset of energy with respect to the scene.

15. The optical system of claim 14, wherein the controller is further configured to:
filter out energy that is outside the intensity spatial frequency ranges after processing the sensor data to identify the corresponding subsets of energy within the intensity spatial frequency ranges.

16. The optical system of claim 14, wherein to generate, for each wavelength band, the corresponding wavelength band image based on the corresponding subset of energy, the controller is further configured to process, for each respective wavelength band, the corresponding subset of energy with an inverse Fourier transform to generate a corresponding wavelength band image that identifies the spatial locations of the subset of energy with respect to the scene.

17. The optical system of claim 16, further comprising:
a display device; and
wherein the controller is further configured to:
generate at least one presentation image based on one or more of the corresponding wavelength band images, the at least one presentation image comprising colorized data configured to be visible to a human eye that identifies the spatial locations of the subsets of energy of the one or more corresponding wavelength band images; and
present the at least one presentation image on the display device.

18. The optical system of claim 17, wherein the controller is further configured to:
determine a wavelength band ratio of a first subset of energy to a second subset of energy;
based on the wavelength band ratio, determine that the scene depicts a particular event of a plurality of events; and present information on the display device that identifies the particular event.

19. The optical system of claim 13, wherein to process the sensor data based on the predetermined pattern to identify the spatial locations of energy, the controller is further configured to:
  process the sensor data based on the predetermined pattern using a Fourier transform to separate at least some of the energy within each corresponding wavelength band into a corresponding intensity spatial frequency range of a plurality of corresponding intensity spatial frequency ranges; and
  generate a plurality of wavelength band images based on the energy separated into the corresponding intensity spatial frequency ranges, each wavelength band image identifying spatial locations of only the energy in the corresponding wavelength band with respect to the scene.

20. The optical system of claim 13, wherein the detector array comprises a focal plane array.

21. The optical system of claim 20, further comprising a cooler assembly, wherein the focal plane array is positioned within the cooler assembly, and wherein the coded aperture comprises a cold filter positioned with respect to the cooler assembly.

* * * * *